(12) United States Patent
Manor

(10) Patent No.: US 9,386,641 B2
(45) Date of Patent: Jul. 5, 2016

(54) LIGHTING DIMMER SYNCHRONOUS LOAD DEVICE

(71) Applicant: Magnitude Lighting Transformers Inc., Tustin, CA (US)

(72) Inventor: Dror Manor, Herzliya (IL)

(73) Assignee: MAGNITUDE HOLDINGS LTD. A BERMUDA EXEMPT COMPANY LIMITED BY SHARES, Boston, MA (US)

( * ) Notice: Subject to any disclaimer, the term of this patent is extended or adjusted under 35 U.S.C. 154(b) by 0 days.

(21) Appl. No.: 14/203,575

(22) Filed: Mar. 11, 2014

(65) Prior Publication Data

US 2014/0312769 A1 Oct. 23, 2014

Related U.S. Application Data

(60) Provisional application No. 61/814,835, filed on Apr. 23, 2013.

(51) Int. Cl.
*H05B 37/02* (2006.01)
*H05B 33/08* (2006.01)

(52) U.S. Cl.
CPC ............ *H05B 33/0815* (2013.01); *H05B 37/02* (2013.01)

(58) Field of Classification Search
CPC ................................ H05B 33/08; H05B 37/02
USPC ........................ 315/194, 224, 291, 307, 308
See application file for complete search history.

(56) References Cited

U.S. PATENT DOCUMENTS

| | | | |
|---|---|---|---|
| 4,396,882 A | 8/1983 | Kellenbenz | |
| 7,061,191 B2* | 6/2006 | Chitta | H05B 41/382 315/307 |
| 7,208,887 B2* | 4/2007 | Mosebrook | H05B 41/2856 315/209 R |
| 8,222,832 B2* | 7/2012 | Zheng | H05B 33/0815 315/211 |
| 8,643,301 B2* | 2/2014 | Kanamori et al. | 315/291 |
| 2007/0206370 A1 | 9/2007 | Crunk | |
| 2010/0164406 A1* | 7/2010 | Kost et al. | 315/307 |
| 2011/0012530 A1* | 1/2011 | Zheng et al. | 315/294 |
| 2012/0293083 A1 | 11/2012 | Miskin et al. | |
| 2013/0264964 A1 | 10/2013 | Luo et al. | |

* cited by examiner

*Primary Examiner* — Tung X Le
(74) *Attorney, Agent, or Firm* — Edward Langer, Adv. & Patent Atty.

(57) ABSTRACT

Method, apparatus and system for efficient driving a lighting means. In accordance with an embodiment of the present invention, there is provided a synchronous load for a lighting system, wherein the lighting system is fed by an AC supply that is potentially produced by a dimmer. The synchronous load is configured to load the AC supply only if the AC supply is found to be actually produced by a dimmer. In this case, the loading period comprises only the times when the AC supply voltage is lower than a given threshold and when current oscillation occurs.

20 Claims, 3 Drawing Sheets

| State | Lighting driver operating | Dimmer detected | AC supply voltage | Loading AC supply |
|---|---|---|---|---|
| 1 | No | Yes | < Vth | Yes |
| 2 | No | Yes | > Vth | T3 only |
| 3 | Yes | Yes | < Vth | Yes |
| 4 | Yes | Yes | > Vth | T3 only |
| 5 | Yes | No | < Vth | No |
| 6 | Yes | No | > Vth | No |

LIGHTING DIMMER SYNCHRONOUS LOAD DEVICE

FIELD OF THE INVENTION

The present invention relates generally to lighting systems, and particularly to methods and systems of feeding an electronic lighting driver by a lighting dimmer.

BACKGROUND OF THE INVENTION

Electronic drivers have become a common means for driving modern lighting sources, typically Light Emitting Diodes (LEDs). Such a drive is sometimes connected to a traditional triac-based lighting dimmer, denoted herein "external dimmer" or "dimmer", which is fed by the AC mains system. In this case undesirable interference might occur.

One interference type is a current surge that typically occurs at the onset of the dimming angle. This surge is part of an oscillation that develops on the driver's input Radio Frequency Interference (RFI) filter and input capacitance when excited by the external dimmer's abrupt transition to the triac conducting mode. This interference would typically disrupt the operation of the driver and the dimmer. Another problem arises, in the case of an external electronic dimmer, when the driver's input capacitance charges during the external dimmer's conducting period and prevents a voltage drop from developing on the external dimmer's control circuits during the dimmer cutoff period.

Adding a series resistor at the driver's input is a known technique used in the art for mitigating the above interference. However, such a series resistor reduces the input voltage of the driver and is not effective enough for external electronic dimmer. Connecting a resistor parallel to the driver input is also a known technique, however power wasteful.

SUMMARY OF THE INVENTION

Accordingly, it is a principal object of the present invention to provide an effective and efficient solution to the interference phenomena arising when connecting a lighting driver, typically a LED driver, to a traditional, typically triac-based, external dimmer, in particular an electronic external dimmer.

In accordance with an embodiment of the present invention, there is provided a dimmer synchronous load for a lighting system, wherein the lighting system is fed by an AC supply voltage, the lighting system comprising a radio frequency interference (RFI) filter coupled to the AC supply voltage for filtering out RF harmonics, a rectifier coupled to the RFI filter for rectifying the AC supply voltage, and a lighting driver coupled to the rectifier and serving to drive a lighting means, the dimmer synchronous load comprising:

a synchronous load coupled to an output of the rectifier and configured, while maintained conducting, to load the AC supply voltage;

a dimmer detector for detecting whether the current consumed by the lighting driver from the AC supply voltage comprises surges that exceed a given intensity, for determining whether the AC supply voltage is produced by a lighting dimmer; and a synchronous load controller coupled to the rectifier for sensing the AC supply voltage, further coupled to the dimmer detector for receiving therefrom an indication whether the AC supply voltage is produced by a lighting dimmer and further coupled to the synchronous load, the synchronous load controller configured to maintain the synchronous load conducting while concurrently receiving from the dimmer detector an indication that the AC supply voltage is actually produced by a lighting dimmer and detecting that the AC supply voltage is lower than a given threshold.

In some embodiments of the dimmer synchronous load, the lighting driver is configured to provide the dimmer detector with a reference indication indicating that the lighting driver has started operating, and the dimmer detector is further configured to artificially determine that the AC supply voltage is produced by a lighting dimmer while not receiving the reference indication, independently of the current consumed by the lighting driver from the AC supply voltage.

In some embodiments of the dimmer synchronous load, the synchronous load controller is further configured to maintain the synchronous load conducting during a given time delay starting upon detecting that the AC supply voltage is no longer lower than the given threshold.

In some embodiments of the dimmer synchronous load, the lighting driver and the synchronous load are coupled to different outputs of the rectifier.

In some embodiments of the dimmer synchronous load, the synchronous load comprises a series arrangement of a resistor and a current limiter.

In some embodiments of the dimmer synchronous load, the synchronous load comprises a series arrangement of a resistor and a switch.

In some embodiments of the dimmer synchronous load, the dimmer detector operation is based on discharging a capacitor, which depends on the current surges intensity.

In some embodiments of the dimmer synchronous load, the lighting means comprises one or more light emitting diodes (LEDs).

In accordance with an embodiment of the present invention, there is further provided a method for adapting a lighting system to an AC supply voltage wherein the AC supply voltage is potentially produced by a lighting dimmer. In an embodiment, the lighting system comprises a lighting driver coupled to the AC supply voltage through a rectifier and a radio frequency interference (RFI) filter, wherein the lighting driver serves to drive a lighting means. The method comprises the steps of:

detecting whether a current consumed by the lighting driver from the AC supply voltage comprises surges that exceed a given intensity, for determining whether the AC supply voltage is produced by a lighting dimmer; and loading the AC supply voltage during a loading period determined by concurrently detecting that the AC supply voltage is lower than a given threshold and that the AC supply voltage is actually produced by a lighting dimmer.

In accordance with an embodiment of the present invention, there is further provided a lighting system comprising:

an input port coupled to an AC supply voltage;

a radio frequency interference (RFI) filter coupled to the AC supply voltage for filtering out RF harmonics;

a rectifier coupled to the RFI filter for rectifying the AC supply voltage;

a lighting driver coupled to the rectifier and serving to drive a lighting means;

a synchronous load coupled to an output of the rectifier and configured, while maintained conducting, to load the AC supply voltage;

a dimmer detector configured to detect whether the current consumed by the lighting driver from the AC supply voltage comprises surges that exceed a given intensity for determining whether the AC supply voltage is produced by a lighting dimmer; and a synchronous load controller coupled to the rectifier for sensing the AC supply voltage, further coupled to the dimmer detector for receiving therefrom an indication whether the AC supply voltage is produced by a lighting dimmer and further coupled to the synchronous load, the synchronous load controller configured to maintain the synchronous load conducting while concurrently detecting that the AC supply voltage is lower than a given threshold and receiving from the dimmer detector an indication that the AC supply voltage is actually produced by a lighting dimmer.

These and other features and benefits of the invention disclosed herein will be more fully understood upon consideration of the following description and the accompanying drawings.

BRIEF DESCRIPTION OF THE DRAWINGS

For a better understanding of the invention with regard to the embodiments thereof, reference is made to the accompanying drawings, in which like numerals designate corresponding elements or sections throughout, and in which.

DETAILED DESCRIPTION OF EMBODIMENTS

Embodiments of the present invention provide improved methods and systems for driving modern lighting means, typically LEDs, wherein the lighting driver is connected to an AC supply voltage that is potentially produced by a dimmer. In an embodiment, an efficient operation of both the lighting driver and the dimmer is achieved due to optimally loading the dimmer by a controllable synchronous load. In particular, the present invention discloses techniques for efficiently suppressing current oscillations that typically result when loading a dimmer by a LED driver, and ensuring a minimal loading that is needed for a proper operation of the dimmer.

Figure 1:
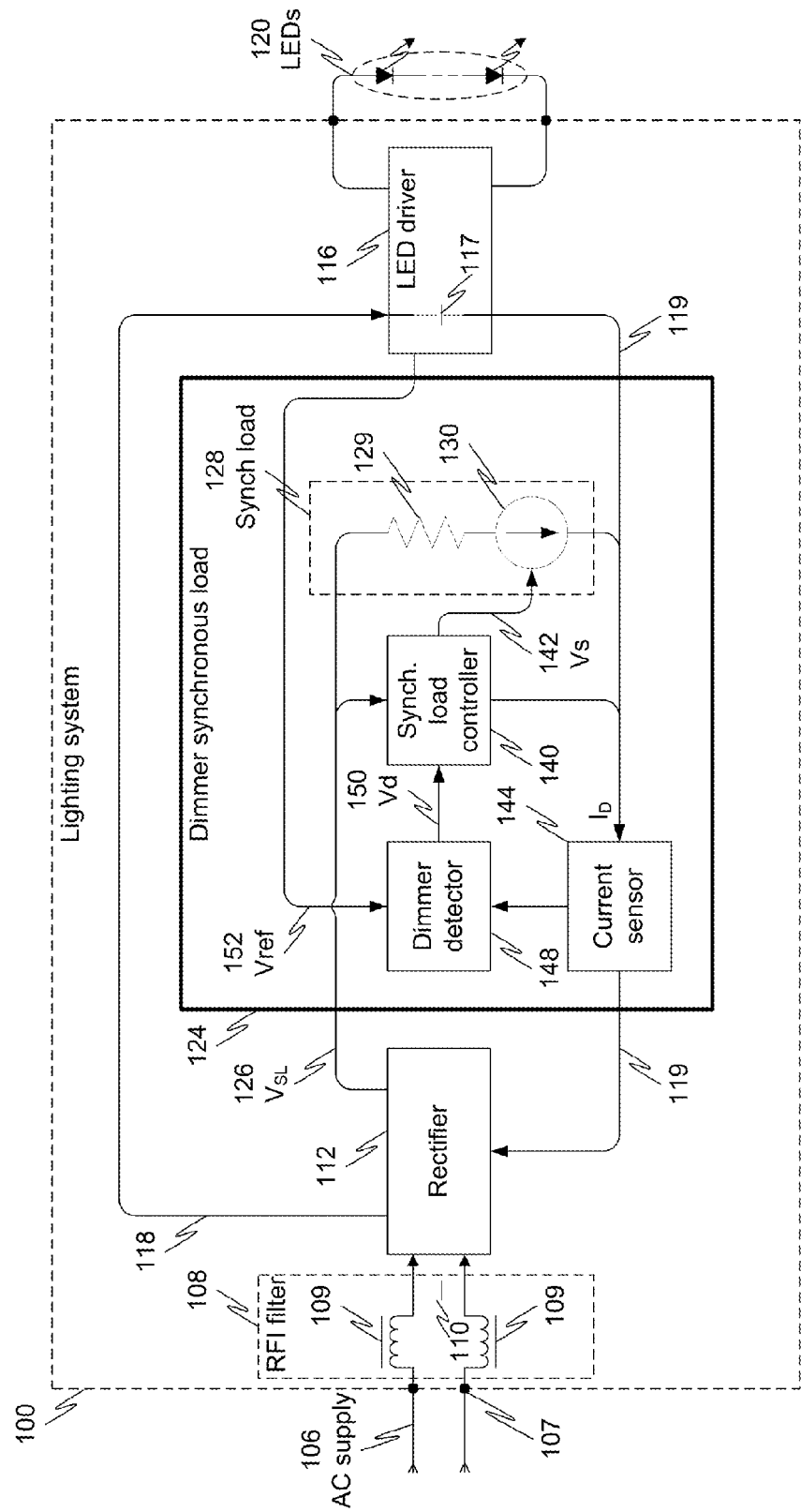
FIG. 1 is a block diagram that schematically illustrates a lighting system, in accordance with an embodiment of the present invention.

Referring to FIG. 1 there is shown a block diagram that schematically illustrates a lighting system 100, in accordance with an embodiment of the present invention. Lighting system 100 is fed by an AC supply 106 which provides an AC supply voltage, denoted 106 as well, fed at an input port 107 of lighting system 100. Within lighting system 100, an RFI filter 108, comprising inductors 109 and a capacitor 110, serves to suppress leakage of RF harmonics from lighting system 100 to AC supply 106. A rectifier 112 next rectifies the AC supply voltage and feeds a LED driver 116 through a rectifier output 118. The LED driver has an input capacitance 117, and drives a lighting means 120, typically one or more LEDs.

The crux of the present invention is illustrated in FIG. 1 by a dimmer synchronous load block 124. Within block 124, a synchronous load 128 is connected to rectifier 112 through a port 126 and a common line 119. LED driver 116 is also connected to line 119. The voltage on port 126 is denoted $V_{SL}$, wherein the notation SL is an acronym of Synchronous Load. In an embodiment, $V_{SL}$ represents the AC supply voltage since it is equal to AC supply voltage 106 after rectification.

In an embodiment, synchronous load 128 is realized by a series arrangement of a resistor 129, and a controllable current source 130 which functions as a switch as well as a current limiter. In an embodiment, synchronous load 128 is connected to a different output port of rectifier 112 than LED driver 116 so as to withhold capacitance 117 from affecting $V_{SL}$.

A synchronous load controller 140 controls synchronous load 128, through a control line 142 carrying a control signal Vs, as explained below. A current sensor 144 on common line 119, typically comprising a small resistor, senses the current that LED driver 116 consumes from AC supply 106. A dimmer detector 148 reads an output of current sensor 144, to detect whether AC supply 106 is produced by a dimmer, and controls controller 140 accordingly by a signal Vd on a line 150.

In an embodiment, dimmer detector 148 operates as follows: When AC supply 106 is produced by a dimmer, the current sensed by sensor 144 contains intensive surges. This is due to oscillation developed on the resonant circuit comprising RFI filter 108 and capacitance 117 when the dimmer, not shown in FIG. 1, abruptly starts conducting. Dimmer detector 148 integrates those surges, and if the integration value exceeds a given intensity, a dimmer detection indication 150 is produced, denoted Vd. In an embodiment, the surge integration is based on discharging a capacitor.

Dimmer detector 148 also receives from LED driver 116 a reference indication 152 denoted Vref, indicating that the lighting driver has started operating. As long as Vref is still low, dimmer detector 148 maintains an artificial detecting state, in which it artificially deems AC supply 106 as produced by a dimmer, independently of the current consumed from AC supply 106, and issues detection indication 150 (Vd).

In an embodiment, synchronous load controller 140 maintains synchronous load 128 conducting so as to load AC supply 106, by means of control signal Vs on line 142. This is done when the following two conditions are concurrently satisfied: signal Vd is received on line 150 from dimmer detector 148, and voltage $V_{SL}$ on port 126 is sensed lower than a given threshold Vth.

Another case in which synchronous load 128 is commanded to conduct is mentioned below. The incentive to load AC supply 106 with synchronous load 128 under the above conditions is that such a dimmer needs a minimal current for conducting, whereas LED driver 116 might not need to consume this current at low AC supply voltage. Signal Vs maintains synchronous load 128 conducting by turning on current source 130, which also functions as switch as explained above. As long as $V_{SL}$ is lower than a certain voltage, $V_{SL}$ and resistor 129 determine the current through synchronous load 128, denoted $I_{SL}$. When $V_{SL}$ exceeds that certain voltage, current source 130, functioning as a current limiter, determines $I_{SL}$.

In an embodiment, synchronous load controller 140 is realized by analog components. In other embodiments the synchronous implementation also comprises a programmable processor as well as analog and digital integrated circuits.

The above description has focused on the specific elements of lighting system 100 that are essential for understanding certain features of the disclosed techniques. Conventional elements of the system that are not needed for this understanding have been omitted from FIG. 1 for the sake of simplicity but will be apparent to persons of ordinary skill in the art.

The configuration shown in FIG. 1 is an example configuration, chosen purely for the sake of conceptual clarity. In alternative embodiments, any other suitable configurations can also be used.

Figure 2:
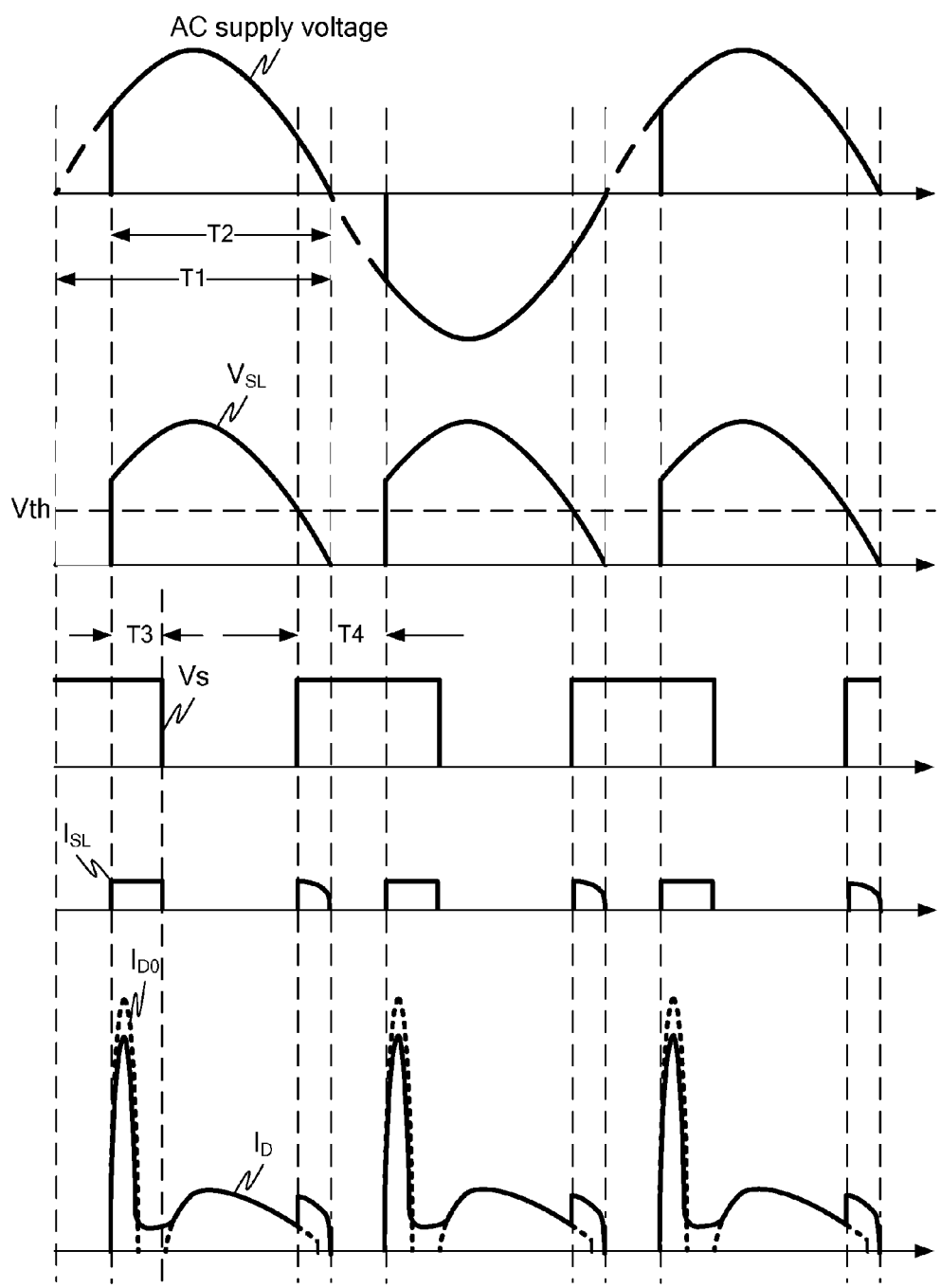
FIG. 2 comprises waveform diagrams that schematically illustrate operation of a lighting system, in accordance with an embodiment of the present invention.

FIG. 2 shows waveform diagrams that schematically illustrate the operation of lighting system 100 while fed by an external dimmer, in accordance with an embodiment of the present invention.

The upper waveform depicts AC supply voltage 106 having a period of 2*T1 seconds. The waveforms that follow are periodical with period T1, therefore, only one period in each waveform is described hereinafter. T2 determines a lighting period within each T1 period, which means a dimming angle of (T2/T1)*π.

Waveform $V_{SL}$ depicts the voltage on synchronous load 128, which is approximately equal to the AC supply voltage after being rectified by rectifier 112. T4, the time period in which $V_{SL}$ is lower than Vth, is explained hereinafter.

Next, there is shown waveform Vs, set high during T4, defined above, and during T3, which is a predefined time delay in which T4 is extended for suppressing the oscillation in $I_D$. Synchronous load controller 140 starts T3 upon detecting an abrupt rise of $V_{SL}$, which occurs when the dimmer starts conducting. T3+T4 constitute a loading period, in which synchronous load 128 is maintained conducting. Obviously, the loading has no practical meaning when $V_{SL}$ equals zero.

Waveform $I_{SL}$ depicts the current through synchronous load 128, which flows when $V_{SL}$ and Vs are concurrently higher than zero.

Waveform $I_{D0}$ depicts, by a dashed line, the current $I_D$ through line 119 in lighting system 100, had dimmer synchronous load 124 not been implemented in an embodiment. It starts with a current surge, which is part of an oscillation that develops on RFI filter 108 and input capacitance 117 due to the dimmer's abrupt transition to conducting mode. The surge is followed by a current cutoff, which would typically disrupt the operation of both LED driver 116 and the dimmer. The rest of $I_{D0}$ waveform consists of LED driver 116 current. It ends with an abrupt cutoff resulting when $I_{D0}$ becomes lower than the dimmer's minimal conducting current.

Waveform $I_D$, depicted over $I_{D0}$, illustrates, during T3, how synchronous load 128 somewhat suppresses ID0 surge, and prevents the dimmer's current cutoff during the descending part of the oscillation. Between end of T3 and start of T4, $I_D$ approximately equals LED driver 116 current, since synchronous load controller 140 shuts down current source 130, by bringing down Vs, for saving power. During T4, $I_{SL}$ flows again to withhold the dimmer from cutting off, therefore $I_D$ turns to be the sum of $I_{D0}$ and $I_{SL}$.

Figure 3:
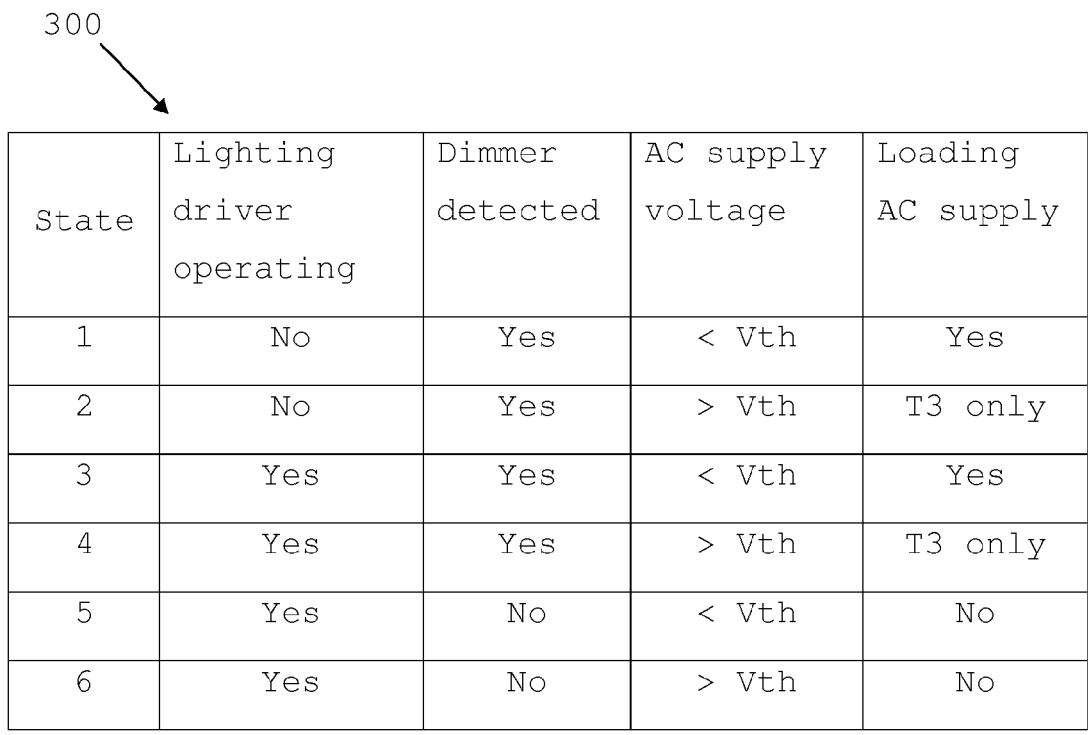
FIG. 3 is a state table that schematically illustrates a method for adapting a lighting system to an AC supply voltage that is potentially produced by a dimmer, in accordance with an embodiment of the present invention.

FIG. 3 shows a state table 300 that schematically illustrates a method for adapting lighting system 100 to AC supply 106 that is potentially produced by a dimmer, in accordance with an embodiment of the present invention.

States 1 and 2 in table 300 relate to the artificial detecting state determined by dimmer detector 148 when lighting driver 116 is not yet operating, disregarding whether AC supply voltage 108 is actually produced by an external dimmer. Synchronous load 128 then conducts, and thereby loads AC supply 106, when $V_{SL}$ is lower than Vth (state 1) and during T3 (state 2).

In states 3 and 4, the lighting driver is already operating, the dimmer actually exists and is detected by dimmer detector 148, and synchronous load 128 behaves the same as in states 1 and 2 respectively.

In states 5 and 6, the lighting driver is operating, an external dimmer doesn't exist and is therefore not detected by dimmer detector 148, hence synchronous load 128 never conducts for saving power.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A dimmer synchronous load for a lighting system, wherein the lighting system is fed by an AC supply voltage, the lighting system comprising a radio frequency interference (RFI) filter coupled to the AC supply voltage for filtering out RF harmonics, a rectifier coupled to the RFI filter for rectifying the AC supply voltage, and a lighting driver coupled to the rectifier and serving to drive a lighting means, the dimmer synchronous load comprising:
   a synchronous load coupled to an output of the rectifier and configured, while maintained conducting, to load the AC supply voltage;
   a dimmer detector for detecting whether the current consumed by the lighting driver from the AC supply voltage comprises surges that exceed a given intensity, for determining whether the AC supply voltage is produced by a lighting dimmer; and
   a synchronous load controller coupled to the rectifier for sensing the AC supply voltage, further coupled to the dimmer detector for receiving therefrom an indication whether the AC supply voltage is produced by a lighting dimmer and further coupled to the synchronous load, the synchronous load controller configured to maintain the synchronous load conducting while concurrently detecting that the AC supply voltage is lower than a given threshold and receiving from the dimmer detector an indication that the AC supply voltage is actually produced by a lighting dimmer.

2. The dimmer synchronous load of claim 1, wherein the lighting driver is configured to provide the dimmer detector with a reference indication indicating that the lighting driver has started operating, and the dimmer detector artificially determines that the AC supply voltage is produced by a lighting dimmer while not receiving the reference indication, independently of the current consumed by the lighting driver from the AC supply voltage.

3. The dimmer synchronous load of claim 1, wherein the synchronous load controller is further configured to maintain the synchronous load conducting during a given time delay starting upon detecting that the AC supply voltage is no longer lower than the given threshold.

4. The dimmer synchronous load of claim 1, wherein the lighting driver and the synchronous load are coupled to different outputs of the rectifier.

5. The dimmer synchronous load of claim 1, wherein the synchronous load comprises a series arrangement of a resistor and a current limiter.

6. The dimmer synchronous load of claim 1, wherein the synchronous load comprises a series arrangement of a resistor and a switch.

7. The dimmer synchronous load of claim 1, wherein the dimmer detector operation is based on discharging a capacitor, which depends on the current surges intensity.

8. The dimmer synchronous load of claim 1, wherein the lighting means comprises one or more light emitting diodes (LEDs).

9. A method for adapting a lighting system to an AC supply voltage, wherein the AC supply voltage is potentially produced by a lighting dimmer, the lighting system comprising a lighting driver coupled to the AC supply voltage through a rectifier and a radio frequency interference (RFI) filter and serving to drive a lighting means, the method comprising the steps of:

detecting whether the AC supply voltage is produced by the lighting dimmer, based on detecting whether a current consumed by the lighting driver from the AC supply voltage comprises surges that exceed a given intensity; and loading the AC supply voltage during a loading period determined by concurrently detecting that the AC supply voltage is lower than a given threshold and that the AC supply voltage is actually produced by the lighting dimmer, such that when said determination is true, the AC supply voltage is loaded by a synchronous load.

10. The method of claim 9, wherein determining that the AC supply voltage is produced by a lighting dimmer comprises an artificial detecting state in which the AC supply voltage is deemed as produced by a lighting dimmer independently of the current consumed by the lighting driver from the AC supply voltage, while detecting that the lighting driver has not yet started operating.

11. The method of claim 9, wherein the step of loading the AC supply voltage comprises extending the loading period during a given time delay which starts upon detecting that the AC supply voltage is no longer lower than the given threshold.

12. The method of claim 9, wherein the lighting means comprises one or more light emitting diodes (LEDs).

13. A lighting system comprising:

an input port coupled to an AC supply voltage;

a radio frequency interference (RFI) filter coupled to the AC supply voltage for filtering out RF harmonics;

a rectifier coupled to the RFI filter for rectifying the AC supply voltage;

a lighting driver coupled to the rectifier and serving to drive a lighting means;

a synchronous load coupled to an output of the rectifier and configured, while maintained conducting, to load the AC supply voltage;

a dimmer detector for detecting whether the current consumed by the lighting driver from the AC supply voltage comprises surges that exceed a given intensity, for determining whether the AC supply voltage is produced by a lighting dimmer; and a synchronous load controller coupled to the rectifier for sensing the AC supply voltage, further coupled to the dimmer detector for receiving therefrom an indication whether the AC supply voltage is produced by a lighting dimmer and further coupled to the synchronous load, the synchronous load controller configured to maintain the synchronous load conducting while concurrently detecting that the AC supply voltage is lower than a given threshold and receiving from the dimmer detector an indication that the AC supply voltage is actually produced by a lighting dimmer.

14. The lighting system of claim 13, wherein the lighting driver is configured to provide the dimmer detector with a reference indication indicating that the lighting driver has started operating, and the dimmer detector artificially determines that the AC supply voltage is produced by a lighting dimmer while not receiving the reference indication, independently of the current consumed by the lighting driver from the AC supply voltage.

15. The lighting system of claim 13, wherein the synchronous load controller is further configured to maintain the synchronous load conducting during a given time delay starting upon detecting that the AC supply voltage is no longer lower than the given threshold.

16. The lighting system of claim 13, wherein the lighting driver and the synchronous load are coupled to different outputs of the rectifier.

17. The lighting system of claim 13, wherein the synchronous load comprises a series arrangement of a resistor and a current limiter.

18. The lighting system of claim 13, wherein the synchronous load comprises a series arrangement of a resistor and a switch.

19. The lighting system of claim 13, wherein the dimmer detector operation is based on discharging a capacitor, which depends on the current surges intensity.

20. The lighting system of claim 13, wherein the lighting means comprises one or more light emitting diodes (LEDs).

* * * * *